Nov. 19, 1946.  A. SERNA  2,411,297
HELICOPTER
Filed Jan. 27, 1944  2 Sheets-Sheet 2
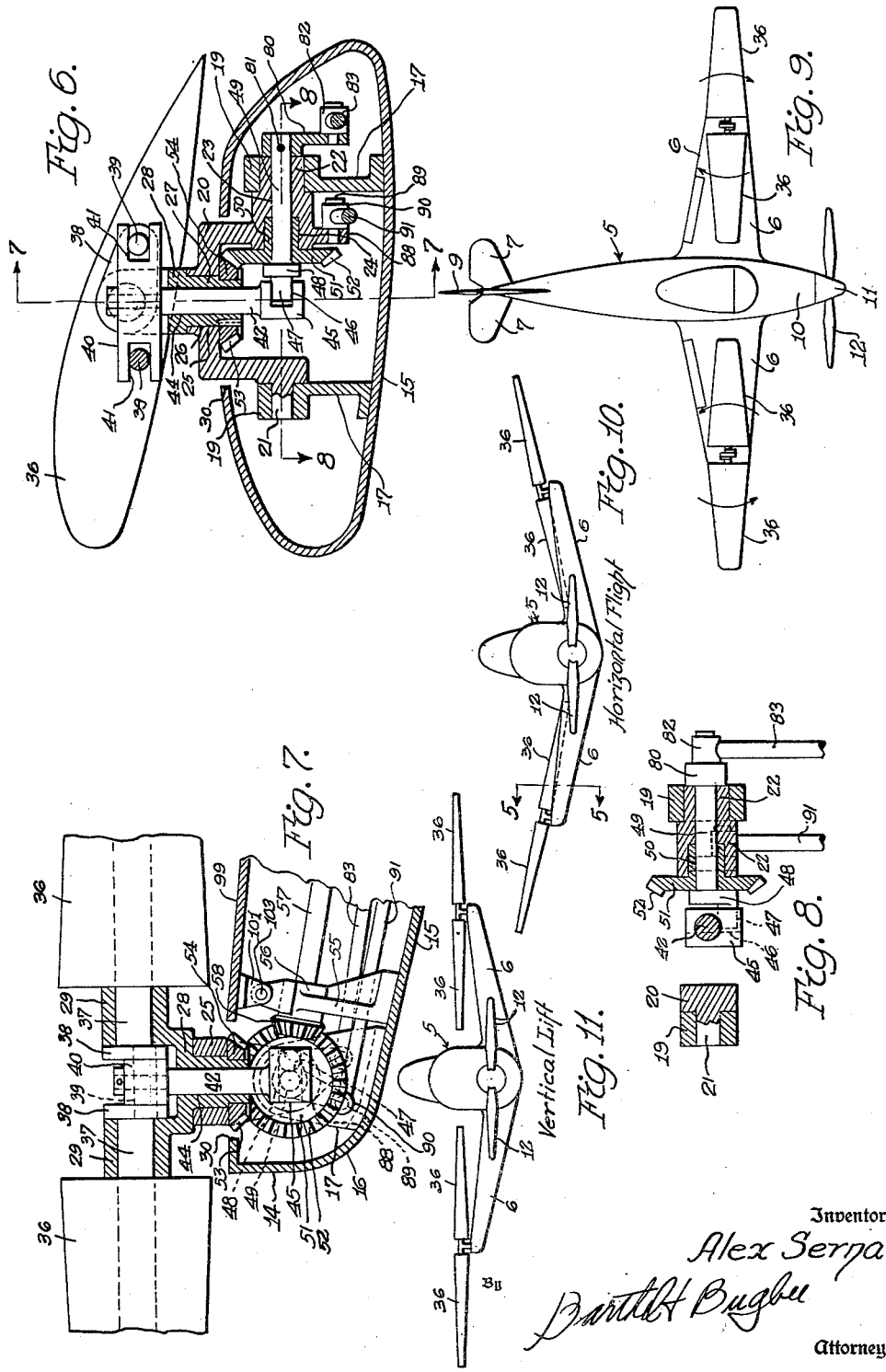
Inventor
Alex Serna
Bartlett Bugbee
Attorneys Patented Nov. 19, 1946

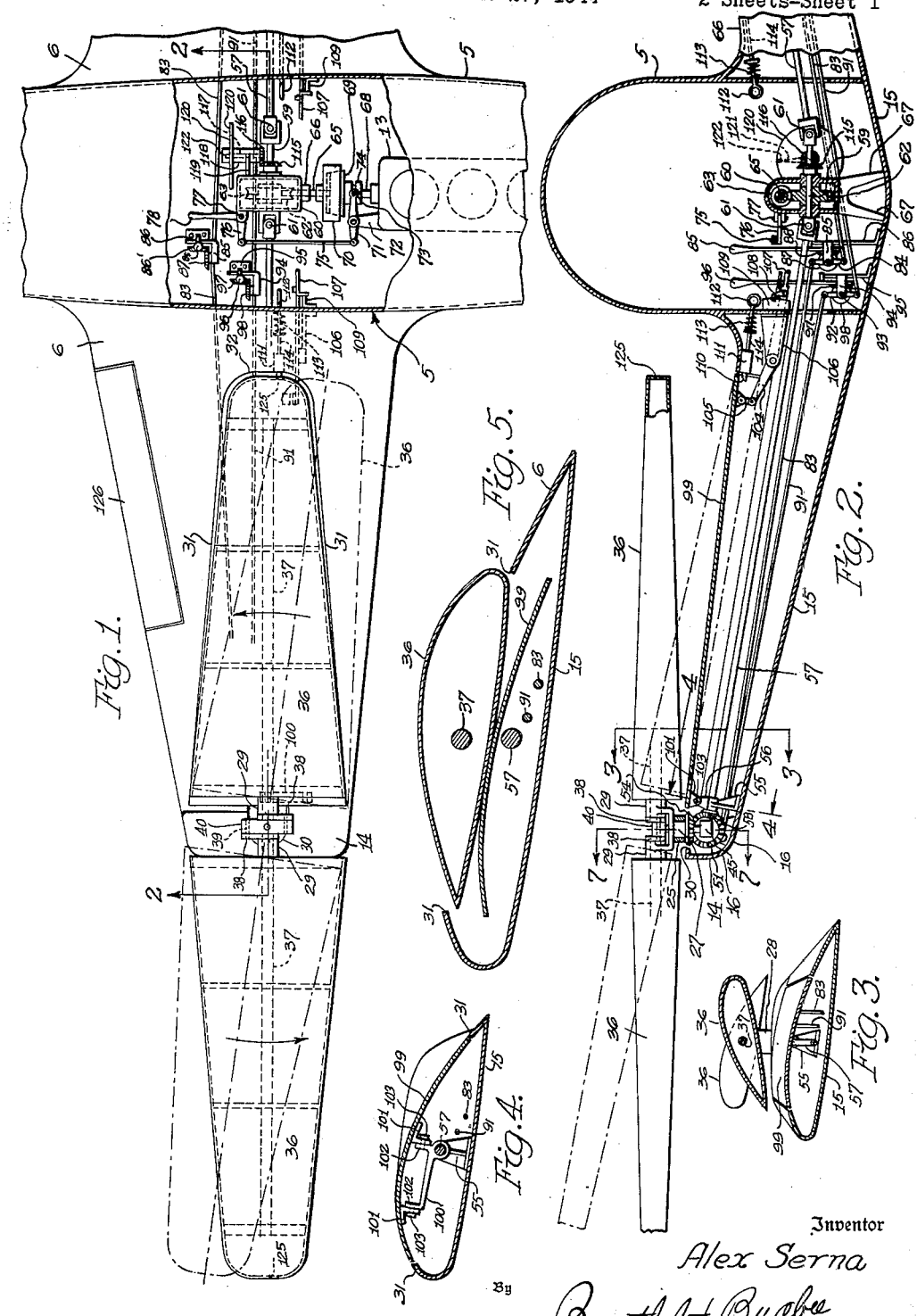

2,411,297

UNITED STATES PATENT OFFICE 2,411,297

HELICOPTER

Alex Serna, Dearborn, Mich.

Application January 27, 1944, Serial No. 519,835

13 Claims. (Cl. 244—7)

The present invention relates to improvements in aircraft and, more particularly, to sustentation and propulsion systems therefor.

The primary object of the invention is to provide an aircraft of the helicopter type in which the vertical lifting means or propellers may be slightly canted to coincide with the wing surface of the plane so that the aircraft may be used for horizontal flight after the desired altitude has been reached.

Another object of the invention is to provide an aircraft of the helicopter type in which the vertical lifting propellers may be canted or slightly tilted from their vertical axis so that one of the blades thereof may be received in a well formed in the wing section of the plane and form a continuous plane surface with the other vane of the propeller projecting beyond the wing section and thereby increasing the overall wing lift area of the plane during its normal horizontal flight.

Another object of the invention is to provide an aircraft of the helicopter type having a novel and unique propulsion system in which both of the vertical lifting propellers are rotated by the propulsion system in such a manner as to cause the propellers to rotate in reverse order during the vertical lift and to permit the propellers to be tilted for horizontal flight so that the extended propeller blades will have substantially the same cross-sectional form as the wing section of the plane.

Another object of the invention is to provide means for locking the propellers within the recesses or wells in the wing section to prevent rotation and substantially lock the propeller to the wing section so that the propeller becomes in effect an integral part thereof.

Another object of the invention is to provide an aircraft of the above-mentioned character with means for tilting the blades of the propeller so as to vary the pitch thereof in reverse order and thereby increase and decrease the lifting power as well as being able to arrange the propeller blades so as to be maintained in co-extensive relation with the wing section.

Another object of the invention is to provide an aircraft of the above-mentioned type with an indicator to record the position of the vertical lift propellers so as to facilitate the tilting thereof into the well or recess in the wing section when the plane is converted for horizontal flight.

Another object of the invention is to provide an aircraft of the above-mentioned type in which relatively short wing sections are employed with the upper surfaces recessed for reception of one of the blades of the lifting propellers and a depressible surface adapted to be hinged into and out of position to form a continuous upper wing surface of the plane when the vertical lifting propellers are employed for gaining altitude.

Other objects and advantages of the invention will become apparent during the course of the following descripton of the accompanying drawings, wherein:

Figure 1 is an enlarged top elevational view of an aircraft embodying the invention, illustrating a portion of the fuselage broken away in order to show the various structural features and details of the drive mechanism;

Figure 2 is a transverse cross-sectional view taken on line 2—2 in Figure 1 looking in the direction of the arrows and illustrating in detail the manner in which the vertical lifting propellers may be projected from the well surface of the wing section when the propellers are used for gaining altitude;

Figure 3 is a vertical cross-sectional view taken on line 3—3 in Figure 2 looking in the direction of the arrows and illustrating the relative positions of the blades of the propeller when the same are angled one to the other;

Figure 4 is a diagonal cross-sectional view taken on line 4—4 in Figure 2 illustrating the hinge joint for the recess cover of the wing section;

Figure 5 is a transverse cross sectional view similar to Figure 4 illustrating the manner in which one of the propeller blades is nested within the well or recess in the wing section during horizontal flight;

Figure 6 is a vertical cross-sectional view taken on line 6—6 in Figure 2 looking in the direction of the arrows and illustrating the various connections and controls for the vertical lift propellers;

Figure 7 is a vertical cross-sectional view taken at right angles to Figure 6 on the line 7—7 thereof further illustrating the manner in which the vertical lift propellers are coupled to permit the angle of the blades to be varied;

Figure 8 is a horizontal cross-sectional view taken on line 8—8 in Figure 6 looking in the direction of the arrows and illustrating the control for the variable pitch propeller;

Figure 9 is a top plan view of an aircraft illustrating the vertical lift propellers on each side thereof and showing the direction in which the same are rotated;

Figure 10 is a front elevational view of the invention showing the propellers in their tilted position for horizontal flight; and Figure 11 is a front elevational view of an aircraft showing the propellers arranged for vertical lift.

In the drawings, wherein for the purpose of illustrating the invention like reference characters will be employed to designate like parts throughout, attention is directed to Figure 9 wherein there is shown an aircraft including a fuselage generally indicated by the reference character 5 having relatively short wing sections 6 at the front end thereof and elevators 7 at the rear. A rudder 9 is mounted between the elevators 7 in the conventional manner to facilitate the steering of the plane when in flight. The fuselage 5 is provided with a cowling 10 and nose 11 for accommodating the propeller 12. The structure thus far described is typical of a conventional aircraft except that the wing sections 6 are formed relatively shorter (Figures 1, 2 and 9). A motor 13 is provided for rotating the propeller 12 as is the usual custom.

The wing sections 6 are relatively short and terminate at the ends in housing portions 14 with the lower wing surface 15 terminating in the housing portion 14 in a well-rounded surface 16 to provide a stream-lined contour. Mounted in the housing portion 14 is a pair of brackets 17 secured to the bottom wall of the wing surface 15 by suitable nuts or bolts and said brackets 17 are provided with trunnion bearings 19 for receiving a yoke frame 20 having trunnions 21 and 22 received in the bearings 19. The trunnion 22 is substantially larger than the trunnion 21 and is provided with a central bore 23 terminating in an enlarged bore portion 24. The yoke frame 20 is provided with an annular boss 25 having a bore 26 for rotatably supporting the hollow shaft portion 27 of a propeller yoke 28 provided with oppositely disposed tubular portions 29. The yoke frame 20 projects upwardly through an opening 30 in the wing surface 6 and said opening communicates with a tapered opening 31 extending inwardly from the outer end of the wing surface to a point 32 adjacent the fuselage 5. The opening 31 terminates at its outer end in the opening 30 which is greatly reduced in size so as to permit the yoke frame 20 to project therethrough (Figures 6 and 7), and yet provide an end wing portion or cover for the top of the housing 14.

Journalled in the tubular portions 29 of the propeller hub yoke 28 is a pair of propeller blades 36 having their shafts as at 37 arranged in opposed relation and provided on the ends thereof with offset arms 38 having eccentrically positioned pins 39. Said pins 39 are received in a cross head 40 having opposed slots 41 for slidably accommodating the pins 39 and rotatably secured to said cross head 40 as by being swivelled, is a shaft 42 which extends downwardly through an opening 44 in the tubular portion 27 of the propeller hub 28. The lower end of the slide rod 42 is provided with a block 45 having a slot 46 for receiving an eccentric pin 47 carried by the offset arm 48 of the rotary control shaft 49 extending through the bore 23. Mounted within the enlarged portion 24 of the bore 23 is the hub portion 50 of a propeller drive gear 51 having its teeth 52 in mesh with the teeth 53 of the gear 54 keyed to the tubular propeller hub 27.

Positioned adjacent the trunnion brackets 17 is a bearing bracket 55 having a bearing boss 56 for supporting the outer end of a drive shaft 57. The outer end of the drive shaft 57 is provided with a bevel gear 58 drivingly engaging the bevel gear 51 so as to rotate the propeller hub 27 about its axis. It is to be understood that the propeller, including the blades 36, may rotate independently of the control shaft 42 and that rotation of the shaft 57 will drive the propeller at a desired rate of speed. The inner end of the shaft 57 is connected to a stub shaft 59 rotatably journalled in a gear housing 60 and as illustrated in Figures 1 and 2, the shaft 57 is connected with the stub shaft 59 by means of a universal connection 61. A worm wheel 62 is secured to the stub shaft and is drivingly engaged by a worm 63 mounted on the end of a shaft 65 which is rotatably supported in the gear housing 60 by the bearing boss 66. The gear housing 60 is supported in the fuselage 5 by means of supporting legs 67 held in place by any suitable means. An extension 68 is formed on the power shaft of the motor 13 and is provided with a clutch member 69 adapted to be drivingly engaged with a clutch member 70 on the shaft 65. The clutch comprising the parts 69 and 70 may be normally held together by a suitable spring mechanism and for the purpose of separating such clutch parts, a lever 71 is fulcrumed on a support 72 formed integral with the motor 13 and said lever is provided with a yoke 73 for being received in a grooved collar 74. A link 75 connects the lever 71 to a bell crank operating lever 76 pivoted as at 77 to the gear housing 60 and said bell crank lever 76 is provided with a handle portion 78 to facilitate clutching and unclutching of the motor shaft 68 with the stub shaft 59.

Connected to the end of the control shaft 49 is a crank arm 80 as by means of a transverse anchoring pin 81 and the free end of the crank arm 80 is provided with a swivel rod connection 82 for connection with a control rod 83. The inner end of the control rod 83 is connected to a rock lever 84 (Figure 2) pivoted on a shaft supported by a suitable bracket 85 having a bracket foot 86 secured to the fuselage floor of the fuselage 5. It is to be noted that the propellers having propeller blades 36 are mounted on the ends of each wing section 6 and since the structure embodied in each propeller mechanism is identical a description of one will suffice for both. By inspection of Figure 2 it will be noted that the control rods 83 are connected to opposite ends of the rock shaft 84 so as to be rocked in unison by means of a hand lever 85 pivoted to the bracket 86 and connected to the rock lever 84 by means of bevel gears 86' and 87.

An extension 88 is formed on the trunnion frame 20 and said extension is provided with a pin 89 upon which is rotatably mounted a control rod connection 90 for accommodating a reciprocating control rod 91. Each control rod has its inner end connected to the arms 92 formed on a rock shaft 93 which is rotatably supported between spaced arms 94 of a bracket 95 so that said rods 91 may operate in unison. A manual control lever 96 is pivoted to the upper end of the bracket 95 and is provided with a bevel gear 97 in mesh with a bevel gear 98 secured to the rock shaft 93 to facilitate rotation of the same and thereby adjust or tilt the trunnion frame 20 on the trunnion support 17.

When the trunnion frame 20 is tilted so as to move the propeller blades 36 from the position shown in Figure 11 to the position shown in Figure 10, one of the blades will be received in the opening 31 while the other blade will project beyond the wing section 6 and form a continuation thereof. When the propeller, including the blades 36 and hub yoke 27 of each wing section 6 are in the position shown in Figure 2, a hinged cover 99 may be provided for covering the opening and forming a continuous upper wing surface. The cover 99 is hinged to a bracket member 100 formed integral with the drive shaft supporting bracket 55 (Figure 4) and, as indicated in Figure 4, the hinged cover 99 is provided with hinge brackets 101 secured to offset portions 102 of the bracket 100 by means of hinge pintles 103. The inner end of each hinged cover 99 is connected to an actuator lever 104 by means of a relatively short link 105 and said actuator lever 104 is pivotally mounted on a bracket 106 secured to the fuselage as shown in Figure 2. The opposite end of the actuator lever 104 is provided with a handle 107 to which is pivoted a detent 108 for engaging within a notch in a sector plate 109, also secured to the fuselage in opposed relation to the bracket 106. The extreme inner end of each hinged cover 99 is adapted to be engaged by means of a spring-projected bolt 110 slidably mounted in a bracket 111 and said spring-projected bolt 110 is provided on one end with a handle 112 extending into the fuselage 5 so as to be presented within easy reach of the pilot. A coil spring 113 encircles the control rod 114 to normally hold the bolt 110 projected so as to engage the edge of the hinged cover 99 and hold the same in place.

Mounted on a projecting end portion of the stub shaft 59 journalled in the reduction gear housing 60 is a bevel gear 115 drivingly engaging a bevel gear 116 secured to a shaft 117 in a bearing bracket 118 and said bearing bracket is secured to the gear housing 60 by means of a supporting arm 119. The bearing bracket 118 is provided with a disc 120 and the shaft 117 is provided with a pointer 121 adapted to register and align with a projection 122 on the disc 120. It is noted that the indicator pointer 121 rotates with the shaft 59 at the same speed thereof and the pointer is positioned so that when it is desired to tilt the yoke frame 20 on its trunnion supports 19, the pilot may determine from the indicator the relative position of the propeller blades 36 shown by dotted lines in Figure 1 so that when the control lever 96 is operated to tilt the trunnion frame 20, the innermost propeller blade of each propeller will be guided through a partial rotation directly into the recess 31.

After the pilot has thus determined the location of the propeller blades 36, the control lever 112 for the latch 110 is operated to release the latch and permit the operation of the hand lever 107 so as to retract the hinged cover member 99 within the recess 31 as shown in Figure 2. After the propeller blades 36 are thus aligned with the opening 31, they may be lowered as indicated in dotted lines in Figure 2 so that the bolts 110 may be projected into an opening 125 in the end of each propeller blade 36. In this manner, the propeller may be held in position so that the outermost blade 36 will extend in alignment with the wing section 6 and form a continuation of the lift surface of the wing section. With the propellers thus nested, the propeller 12 may cause the plane to be propelled in a horizontal flight as indicated in Figure 10. During landing or ascension, the propellers may be arranged as shown in Figure 2 by operating the control lever 96 after which the control lever 85 is shifted to angle the blades 36 of the propellers to give the required lifting effect. When the propellers are left tilted or angled one to the other by operation of the control lever 85, the clutch including the parts 69 and 70 may be engaged by operation of the lever 78 so as to drive the propellers and cause the same to be rotated for accomplishing a vertical lift as shown in Figure 11. When the propellers are thus arranged as shown in Figure 2, the hinged covers 99 are raised by the control lever 107 and held in place by the detent 108 engaging within the notch in the sector plate 109. It is to be understood that during horizontal flight, the propeller blades 36 will be rocked about their axes 37 so that the innermost blade will be nested in the opening 31 and with its surface faired into the adjacent wing surface to form an aerodynamic cross-sectional profile of the wing section in which it is nested, as shown in Figure 5, while the outermost blade will extend beyond the wing section and likewise conform in cross section to the cross section of the wing section 6.

It is to be understood that the aircraft above described may be converted from a helicopter type plane to a conventional plane in a relatively short time so that after the desired altitude has been reached the conversion may be made quickly so as not to lose altitude upon cessation of operation and rotation of the propellers 36. During the vertical flight the propeller 12 may be rotated to cause a combined horizontal and vertical lift with the wing section providing a portion of the vertical lift and the ailerons 126 adjusted accordingly for such combined forward and vertical motion.

During the above-mentioned conversion, the area of the wing section 6 is sufficient to support the plane in horizontal flight. Also, the propeller 12 may be of the variable pitch type so as to control the forward travel of the plane during take-offs.

It is to be understood that the form of the invention herewith shown and described is to be taken as a preferred embodiment of the invention and that various changes may be made in the shape, size and arrangement of parts without departing from the spirit of the invention or the scope of the subjoined claims.

What I claim is:

1. In combination with an aircraft having wing sections and a propeller for horizontal flight, a vertical lifting propeller mounted adjacent the end of each wing section, means for rocking said vertical lifting propellers transversely of their axes from an operative position to a position of rest so that a portion of each lifting propeller will be received in a recess in its corresponding wing section with the remaining portion thereof extending beyond the wing section, and means for rotating said propellers in reverse directions when in said operative position.

2. In combination with an aircraft having wing sections and a propeller for horizontal flight, a vertical lifting propeller mounted on each wing section adjacent the end thereof for rotational and rocking movement, means for rocking said lifting propellers transversely of their axes from an operative position to a position of rest so that a portion of each lifting propeller will be received in a recess in its corresponding wing section with the remaining portion thereof extending beyond said corresponding wing section, and means for locking said vertical lifting propellers within their respective recesses when said propellers are in their positions of rest.

3. In combination with an aircraft having wing sections and a propeller for horizontal flight, a vertical lifting propeller mounted for rotation adjacent the end of each wing section, said lifting propellers being supported for rocking movement about axes extending transversely of the wing sections and the axes of rotation thereof, means for rocking said propellers transversely of their axes from an operative position to a position of rest so that a portion of each lifting propeller will be received in a recess in its corresponding wing section with the remaining portion thereof extending beyond the wing section, and means for varying the pitch of said vertical lifting propellers so that said lifting propellers can be faired into the adjacent wing surfaces when shifted from said operative position to said position of rest.

4. In combination with an aircraft having wing sections and a propeller for horizontal flight, a vertical lifting propeller mounted for rotation adjacent the tip of each wing section, said lifting propellers each being supported to rock about pivotal axes extending transversely of the respective wing sections and the axes of rotation of said lifting propellers, means for rocking said lifting propellers transversely of their axes from an operative position to a position of rest so that a portion of each lifting propeller will be received in a recess in its corresponding wing section with the remaining portion thereof extending beyond the wing section, and means for rotating said lifting propellers in reverse directions when in said operative position, each of said vertical lifting propellers being of a length substantially equal to twice the length of each wing section.

5. In combination with an aircraft having wing sections and a propeller for horizontal flight, a vertical lifting propeller mounted for rotation adjacent the tip of each wing section, said lifting propellers each being supported to rock about pivotal axes extending transversely of the respective wing sections and the axes of rotation of said lifting propellers, means for rocking said lifting propellers transversely of their axes from an operative position to a position of rest so that a portion of each lifting propeller will be received in a recess in its corresponding wing section with the remaining portion thereof extending beyond the wing section, and means for rotating said vertical lifting propellers in reverse directions when in said operative position, each of said vertical lifting propellers being arranged with respect to its corresponding wing surface when in its inoperative position so that said portion will lie within the recess and form a substantially uninterrupted streamlined surface for its corresponding wing section.

6. In combination with an aircraft having wing sections and a propeller for horizontal flight, a vertical lifting propeller mounted for rotation adjacent the tip of each wing section, means for rocking said lifting propellers transversely of their axes from an operative position to a position of rest so that a portion of each lifting propeller will be received in a recess in its corresponding wing section with the remaining portion thereof extending beyond the wing section, and a cover for each of said recesses to form a substantially continuous streamlined surface for each wing section when the vertical lifting propellers are arranged for vertical flight.

7. In combination with an aircraft having wing sections and a propeller for horizontal flight, a vertical lifting propeller mounted for rotation adjacent the tip of each wing section, means for rocking said lifting propellers transversely of their axes from an operative position to a position of rest so that a portion of each lifting propeller will be received in a recess in its corresponding wing section with the remaining portion thereof extending beyond the wing section, a movable cover for each of said recesses to form a continuous streamlined surface for each wing section when the vertical lifting propellers are arranged for vertical flight, and means operable from a position within said aircraft for moving said recess covers to cover and uncover said recesses.

8. In combination with an aircraft having wing sections and a propeller for horizontal flight, a vertical lifting propeller mounted for rotation adjacent the tip of each wing section, means for rocking said lifting propellers transversely of their axes from an operative position to a position of rest so that a portion of each lifting propeller will be received in a recess in its corresponding wing section with the remaining portion thereof extending beyond the wing section, a cover for each of said recesses to form substantially continuous streamlined wing surfaces when the vertical lifting propellers are arranged for vertical flight, means operable from within said aircraft for moving said recess covers to and from a position in which said covers form said streamlined wing surfaces, and means projecting into said recesses for locking the nested portion of each vertical propeller therein when said lifting propellers are at rest.

9. In combination with an aircraft having wing sections, a power plant and a propeller for horizontal flight, a vertical lifting propeller mounted for rotation adjacent the tip of each wing section, said propellers being mounted for rocking and swinging movement about axes at the tips of their respective wing sections extending transversely thereof, means for rocking said lifting propellers transversely of their axes from an operative position to a position of rest so that a portion of each lifting propeller will be received in a recess in its corresponding wing section with the remaining portion thereof extending beyond the wing section and providing an airfoil surface member, means for rotating said propellers in reverse directions when in said operative position, and means for drivingly connecting said propellers to the power plant of said aircraft.

10. In combination with an aircraft having wing sections, a vertical lifting propeller for each wing section having blade portions, said propellers being mounted for rotation about their axes adjacent the ends of the wing sections and being rockably movable to a position of rest with one of the blades of each of said propellers nested in a recess in its corresponding wing section and the remaining blade portion of each of said propellers projecting beyond its corresponding wing section.

11. In combination with an aircraft having relatively short wing sections, a vertical lifting propeller mounted adjacent the end of each wing section for rotation about their axes, means for rockably mounting said propellers to swing about axes disposed at right angles to their axes of rotation and transversely of said wing sections, means for rotating said propellers in reverse directions, means for rocking said propellers from an operative position to a position of rest, and means for holding said propellers in said position of rest with portions thereof received in recesses in the wing sections and the remaining portions projecting beyond and forming extensions of said wing sections.

12. In combination with an aircraft having wing sections, a vertical lifting propeller mounted on each wing section having radial blade portions, means for rockably moving said propellers from an operative lifting position to a position of rest with a blade portion of each propeller received within a recess in its corresponding wing section and the remaining blade portions of said propellers projecting beyond the wing sections to provide continuations of the wing sections, and means for rotating said propellers when in an operating position for vertical lifting flight.

13. In combination with an aircraft having wing sections and a propeller for horizontal flight, a vertical lifting propeller mounted for rotation adjacent the tip of each wing section, said propellers being pivotally supported in rocking movement about axes extending transversely of their respective wing sections, means for rocking said lifting propellers transversely of their axes from an operative position to a position of rest so that a portion of each lifting propeller will be received in a recess in its corresponding wing section with the remaining portion thereof extending beyond the wing section and providing an airfoil surface, a cover for each of said recesses positionable to form a substantially continuous streamlined surface with its adjacent wing surface when the vertical lifting propellers are arranged for vertical flight, means for rotating said propellers, and means operable from a location within the aircraft for controlling the propeller rocking means and said rotating means.

ALEX SERNA.